(12) United States Patent
Katta et al.

(10) Patent No.: US 8,352,382 B1
(45) Date of Patent: Jan. 8, 2013

(54) HEURISTIC METHODS FOR CUSTOMER ORDER FULFILLMENT PLANNING

(75) Inventors: Akshay Kumar Reddy Katta, Seattle, WA (US); Russell Allgor, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1133 days.

(21) Appl. No.: 12/192,523

(22) Filed: Aug. 15, 2008

(51) Int. Cl.
*G06Q 30/00* (2012.01)

(52) U.S. Cl. ...................................... 705/330

(58) Field of Classification Search ............... 705/330
See application file for complete search history.

(56) References Cited

U.S. PATENT DOCUMENTS

| | | | |
|---|---|---|---|
| 2003/0018502 A1* | 1/2003 | Rodriguez | 705/7 |
| 2004/0267675 A1* | 12/2004 | Burton et al. | 705/400 |
| 2007/0011017 A1* | 1/2007 | Field | 705/1 |

OTHER PUBLICATIONS

Ping, Josephine Xu, "The Benefits of Re-Evaluating the Real-Time Fulfillment Decisions," Manufacturing & Service Operations Management, Winter 2006, pp. 104-107.*

* cited by examiner

*Primary Examiner* — Nathan Erb
(74) *Attorney, Agent, or Firm* — Robert C. Kowert; Meyertons, Hood, Kivlin, Kowert & Goetzel, P.C.

(57) ABSTRACT

Techniques for heuristic customer order fulfillment planning. A method may include iteratively partitioning ordered items into shipment groups according to a set partition algorithm. Of a working set including the unassigned items, the algorithm may determine the subset that optimizes fulfillment cost per member of the subset, and may assign this subset to a shipment group. To determine the subset, the algorithm may iterate over the set of combinations of fulfillment decision variables. For each combination, a list of members of the working set that may be shipped according to the combination is generated. The subset of this list that optimizes, per member of the subset, the costs of shipping according to the combination is then identified.

36 Claims, 6 Drawing Sheets

HEURISTIC METHODS FOR CUSTOMER ORDER FULFILLMENT PLANNING

BACKGROUND

Description of the Related Art

In order to offer customers a variety of items readily available for delivery, many merchants (whether engaging in electronic or conventional "brick and mortar" commerce) hold various quantities of such items within inventory facilities. Keeping items in inventory may serve to buffer variations in customer demand or a manufacturer or distributor's ability to supply various items. For example, different items offered for sale by a merchant may have different manufacturer lead times. Holding quantities of such items as inventory may enable a merchant to offer consistent availability of these items to customers despite the different lead times.

As an enterprise seeks to expand its offerings to customers, it may increase the number of locations at which its inventory is stored. It may also arrange with a variety of different shippers in order to deliver its inventory to customers. Such expansion may enable the enterprise to service customers more quickly and/or efficiently. For example, if an inventory item is available from multiple different locations that are situated so as to reduce the average distance from a customer to the nearest location, customers may on average receive the item more quickly than if the item were shipped from one central location.

While increasing the number of inventory locations or number of shipping methods may increase the flexibility an enterprise has in fulfilling any particular order, it may also increase the complexity of deciding how to perform that fulfillment. When there are many possible ways in which an order may be fulfilled, and when there are significant disparities in cost between the various options, simply picking one option at random may be unacceptably costly. On the other hand, as the number of fulfillment options increases, the amount of effort required to evaluate the cost of each option may also be unacceptably costly.

Figure 1:
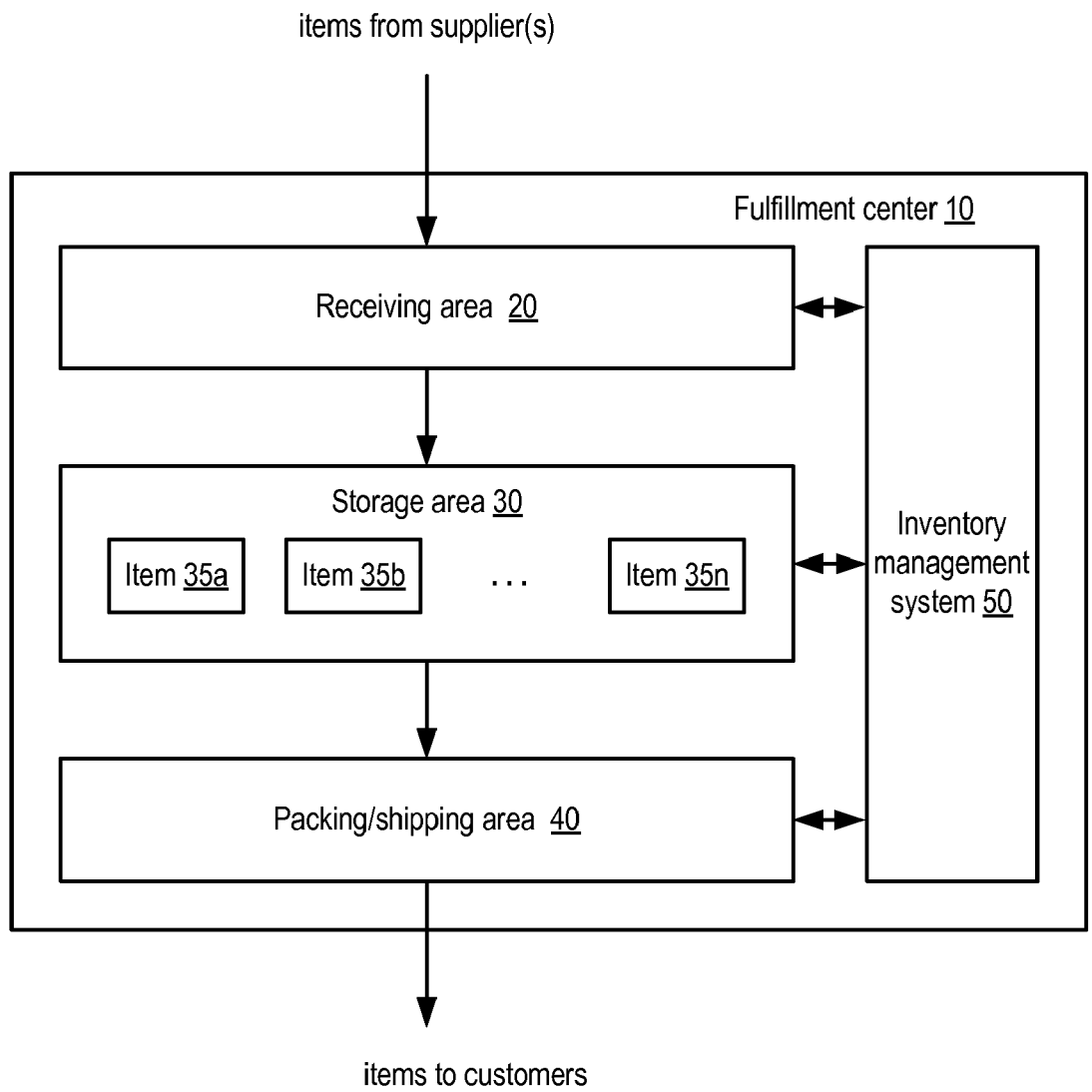
FIG. 1 is a block diagram illustrating one embodiment of a fulfillment center.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

As noted above, the complexity of determining how best to fulfill the items ordered by a customer when there are many possibilities for fulfillment may present operational challenges. In the following discussion, variations of heuristic algorithms are discussed that may be employed to generate fulfillment plans for multiple-item orders. Such heuristic algorithms may exhibit better performance than exact optimization algorithms when scaling to large solution spaces.

First, a general overview of a fulfillment center and a fulfillment network in which heuristic fulfillment planning techniques may be employed is discussed. Next, the general characteristics of exact and heuristic optimization algorithms are described. Various specific heuristic techniques that may exhibit improved performance relative to exact techniques are then explored. Finally, an exemplary computer system embodiment that may be employed to implement the various features of this disclosure is discussed.

Overview of Fulfillment Center and Fulfillment Network

In some instances, an enterprise may store inventory within a fulfillment center in anticipation of customer orders. One embodiment of a fulfillment center configured to store inventory items is illustrated in FIG. 1. In the illustrated embodiment, fulfillment center 10 includes a receiving area 20, a storage area 30 configured to store an arbitrary number of items 35a-n, and a packing/shipping area 40. The arrangement of the various areas within the illustrated embodiment of fulfillment center 10 is depicted functionally rather than schematically. For example, in some embodiments, it is noted that multiple different receiving areas 20, storage areas 30 and packing/shipping areas 40 may be interspersed rather than segregated. Additionally, fulfillment center 10 includes an inventory management system 50 configured to interact with each of receiving area 20, storage area 30 and packing/shipping area 40.

Fulfillment center 10 may be configured to receive different kinds of items 35 from various suppliers and to store them until a customer order specifying particular ones of items 35 is received. The particular items 35 may then be selected from storage and sent to the customer. The general flow of items through fulfillment center 10 is indicated using arrows. Specifically, in the illustrated embodiment, items 35 may be received from one or more suppliers, such as manufacturers, distributors, wholesalers, etc. at receiving area 20. In various embodiments, items 35 may include merchandise, commodities, perishables, or any suitable type of item depending on the nature of the enterprise that operates fulfillment center 10. Upon being received from a supplier at receiving area 20, items 35 may be prepared for storage. For example, in some embodiments items 35 may be unpacked or otherwise rearranged, and inventory management system 50 (which, as described below, may include one or more software applications executing on a computer system) may be updated to reflect the type, quantity, condition, cost or any other suitable parameters with respect to newly received items 35. It is noted that items 35 may be stocked, managed or dispensed in terms of countable, individual units or multiples of units, such as packages, cartons, crates, pallets or other suitable aggregations. Alternatively, some items 35 such as bulk products, commodities, etc. may be stored in continuous or arbitrarily divisible amounts that may not be inherently organized into countable units. Such items 35 may be managed in terms of measurable quantities such as units of length, area, volume, weight, time duration or other dimensional properties characterized by units of measurement. Generally speaking, a quantity of an item 35 may refer to either a countable number of individual or aggregate units of an item 35 or a measurable amount of an item 35, as appropriate.

After arriving through receiving area 20, items 35 may be stored within storage area 30. In some embodiments, like items 35 may be stored together in bins, on shelves or via other suitable storage mechanisms, such that all items 35 of a given kind are stored in one location. In other embodiments, like items 35 may be stored in different locations. For example, to optimize retrieval of certain items 35 having high turnover within a large physical facility, those items 35 may be stored in several different locations to reduce congestion that might occur at a single point of storage.

When a customer order specifying one or more of items 35 is received, the corresponding items 35 may be selected or "picked" from storage area 30. In various embodiments, item picking may range from minimally automated to completely automated picking. For example, in one embodiment fulfillment center employees may pick items 35 using written or electronic pick lists derived from customer orders, while in another embodiment conveyor belts and robotics may be used to pick and transfer items 35. In some embodiments, pick list generation or robotic picking may occur under the control or direction of inventory management system 50. After the items 35 corresponding to a particular order are picked, they may be processed at packing/shipping area 40 for delivery to the customer. For example, items may be packaged for shipment to the customer using a common carrier, or simply bagged or otherwise prepared for direct transfer to a customer, e.g., at an order pickup counter. In some embodiments, further interaction with inventory management system 50 may occur when items 35 are picked from storage area 30 and/or processed at packing/shipping area 40, for example to update inventory records to reflect the removal of inventory, to record revenue for the sale or other transaction (e.g., lease, rental, exchange, etc.) and so forth.

An enterprise that deals with customers on a large scale may not adequately meet its business goals with only a single fulfillment center 10. For example, an enterprise that deals in many different types of items 35 and/or that services customers in a large geographical region may find it impractical to keep all of its inventory in one facility. In some instances, an enterprise that faces the challenge of scaling its inventory and fulfillment handling capabilities may choose to deploy a more complex fulfillment network.

Figure 2:
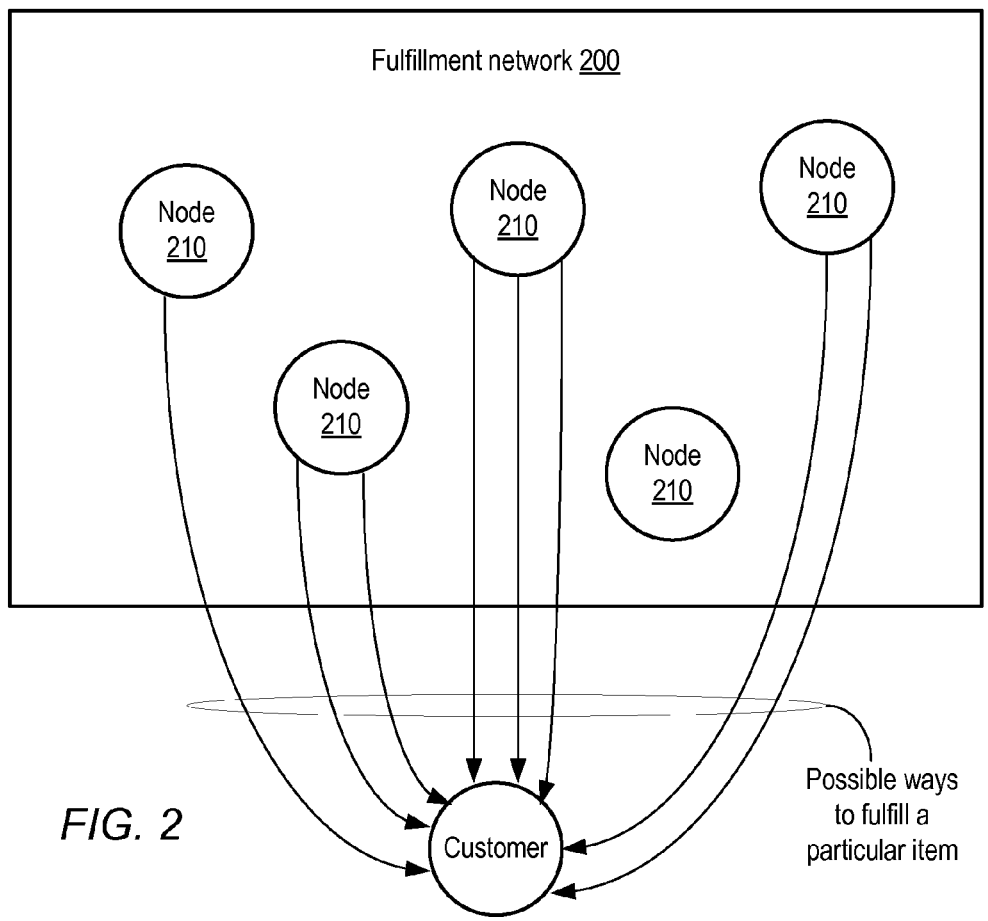
FIG. 2 is a block diagram illustrating one embodiment of a fulfillment network.

One embodiment of a fulfillment network is illustrated in FIG. 2. In the illustrated embodiment, fulfillment network 200 (or simply, network 200) includes a number of nodes 210. Generally speaking, each node 210 may correspond to a source from which various items 35 may be shipped to fulfill customer orders. Depending on the implementation of network 200 and/or the state of network 200 at any given time, certain items 35 may or may not be available for shipment at certain nodes 210. For example, units of high-volume items 35 that have relatively uniform geographical demand may be stocked at most or all of nodes 210, while items 35 that are ordered with low volume or that exhibit regional patterns of demand may be stocked at few nodes 210 or a single node 210 (or, in some instances, not stocked at all within network 200, as in the case of items 35 that may be manufactured to order, are subject to special ordering procedures, or are otherwise subject to exceptional treatment).

In some instances, a node 210 may correspond to an instance of a fulfillment center such as fulfillment center 10. For example, an enterprise may expand its fulfillment capabilities by establishing a network 200 including multiple fulfillment centers 10, such as a West Coast facility and an East Coast facility. However, other options beyond fulfillment centers 10 may exist for deploying nodes 210 within network 200. In one embodiment, a node 210 may represent an instance of forward-deployed inventory. Generally speaking, forward-deployed inventory may refer to instances in which inventory is relocated within the supply chain to be closer to the eventual customer than in the typical model of warehoused inventory. For example, an enterprise may arrange with a shipping carrier to place prepackaged, ready-to-ship units of various items 35 within various ones of the shipping carrier's hubs. By pre-positioning forward deployed inventory with shippers, an enterprise may reduce the overall time needed to deliver an item 35 to a customer when an order occurs, or may be better able to handle high-volume shipping situations such as initial releases of highly anticipated products.

Nodes 210 may also represent other types of inventory-management relationships. In one embodiment, a node 210 may be representative of a third party manufacturer or merchant that holds certain items 35 and handles their fulfillment on behalf of the network 200. For example, such a node 210 may correspond to a manufacturer of item 35 that may have no retail sales channels of its own. In this case, the enterprise that manages network 200 may receive an order and responsively instruct the third party manufacturer to ship the item 35 in accordance with the order. In other instances, node 210 may represent a third party merchant that has its own separate sales channels, but which has arranged with an enterprise to handle fulfillment of certain items 35. Such an arrangement may enable an enterprise to offer certain items 35 to its customers without having to directly deal with the storage or handling of these items 35. This arrangement may be particularly beneficial when certain items 35 require special handling and/or storage infrastructure (e.g., perishable or hazardous goods). Generally speaking, third party entities that handle fulfillment of certain items 35 on behalf of and at the instruction of an enterprise may be referred to as "drop shippers."

In various embodiments, network 200 may be implemented at different levels of granularity than those mentioned above. For example, network 200 may be implemented such that some or all nodes 210 represent not only a general location of an item 35 within network 200, such as a fulfillment center 10, but also a specific location, such as an area, rack, bin, pallet, or other specific location within the general location. In such an embodiment, some groups of nodes 210 within network 200 may represent fine structure within a single facility, to an arbitrarily suitable level of granularity. Additionally, in some embodiments, individual nodes 210 may correspond to individual combinations or partial combinations of decision variables such as the decision variables described below with respect to FIG. 7. It is also contemplated that network 200 may be implemented at coarser levels of granularity than described above, such that a node 210 may correspond to more than one fulfillment center 10 or other entity.

It is noted that in various embodiments, network 200 may include any number of various types of nodes 210 in any suitable combination, and may include node types other than those discussed above. Additionally, in some embodiments of network 200, additional paths or arcs may exist between various nodes 210 of network 200 in addition to between a node and a customer. For example, although not shown in FIG. 2, arcs between nodes 210 may be indicative of ways in which inventory may be relocated from one node 210 to another (e.g., in response to shifts in actual or anticipated demand in the various regions served by network 200). Such relocation may occur in the course of processing a customer order (e.g., an item 35 may be transferred from one node 210 to another prior to being shipped to a customer) and/or independently of any customer order.

Figure 3:
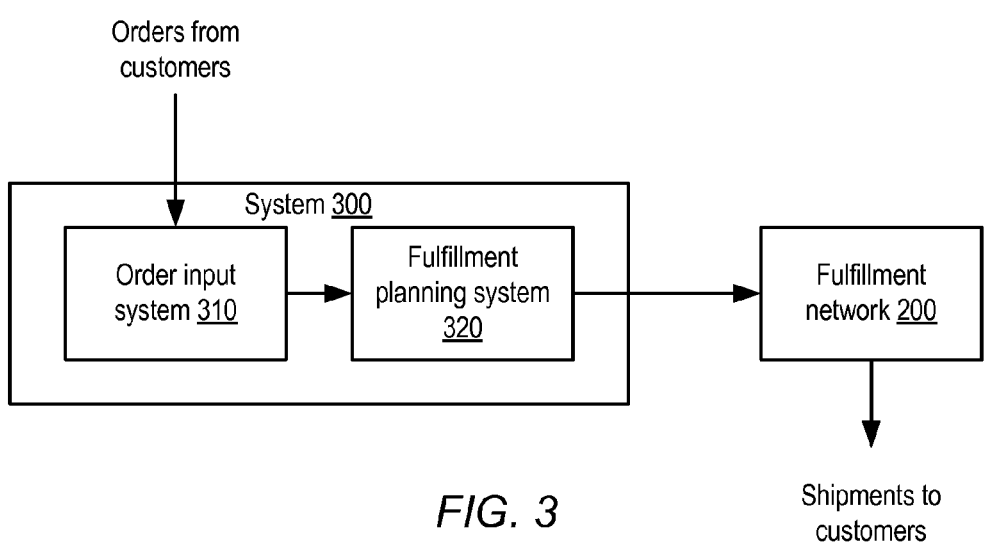
FIG. 3 is a block diagram illustrating one embodiment of a system configured to receive customer orders and perform fulfillment planning with respect to a fulfillment network.

FIG. 3 illustrates one embodiment of a system that may be configured to receive customer orders for items 35, determine how customer orders should be assigned to the resources of network 200 for fulfillment, and dispatch instructions to the assigned resources of network 200 in order to effect shipment of customer orders. In the illustrated embodiment, system 300 includes an order input system 310 that is configured to communicate with a fulfillment planning system 320, which is in turn configured to communicate with network 200.

Generally speaking, order input system 310 may be configured to receive orders placed by customers for various items 35 offered by the enterprise. In some embodiments, order input system 310 may be configured to implement an electronic commerce (e-commerce) portal, such as a web-based interface through which customers may browse items 35, select items 35 for ordering, and supply details regarding orders (e.g., payment information, shipping address information, etc.). In other embodiments, order input system 310 may be configured to implement an order entry interface that is not presented to the customer directly, but which is instead employed by an agent (e.g., a salesperson, customer service representative, etc.) to input order information on behalf of a customer.

Fulfillment planning system 320 may generally be configured to receive incoming orders received by the enterprise via order input system 310 and to analyze customer orders to determine how they should be assigned to various nodes 210 of network 200 for fulfillment. For example, if a given customer orders five distinct items 35, it may be possible to ship all of the ordered items 35 from a single node 210, such as in the case where all of the ordered items 35 are available within a single fulfillment center 10. However, it may also be possible to divide the given customer's order for fulfillment by multiple different nodes 210. As discussed below, numerous different variables and constraints may be taken into account by fulfillment planning system 320 when generating a fulfillment plan for an order, such as the costs associated with various plans, the promises made to the customer regarding shipping or arrival dates, or other factors.

After identifying the fulfillment plan that should be executed for a particular order, fulfillment planning system 320 may be configured to communicate instructions to network 200 in order to realize the plan. For example, fulfillment planning system 320 may interact with the inventory management system 50 of a fulfillment center 10 corresponding to a particular node 210 to instruct that certain items 35 of a particular order should be picked, packed, and shipped to the customer for the particular order. Alternatively, fulfillment planning system 320 may interact with a drop shipper, such as a third party merchant or distributor, to instruct that certain items 35 of a particular order should be shipped to the customer. In various embodiments, communication of fulfillment instructions that are needed to implement a particular fulfillment plan to the various nodes 210 within network 200 may occur according to any suitable technique. For example, fulfillment planning system 320 may be configured to exchange messages with systems within a particular node 210 using web-based protocols (e.g., Hypertext Transfer Protocol (HTTP), eXtensible Markup Language (XML), or other suitable protocols) conveyed via the public Internet, a private intranet, Virtual Private Networks, or another suitable networking scheme or combination of these. Communication between fulfillment planning system 320 and nodes 210 may also be implemented using electronic mail or other messaging techniques, analog or digital telephony, or any other wired or wireless data transfer technique, either using standard or proprietary protocols.

In various embodiments, order input system 310 and fulfillment planning system 320 may be implemented as respective dedicated computer systems, or they may be implemented as computer-executable instructions and data that may be executed by one or more computer systems (e.g., as described in greater detail below with respect to FIG. 9). Systems 310 and 320 are discussed and shown as separate systems in order to facilitate their description; however, in some embodiments, the functions of these systems may be integrated into and implemented by a single computer system or set of computer-executable instructions. Alternatively, the functionality of systems 310 and 320 may be partitioned differently than is shown in FIG. 3. For example, some functions of these systems may be assigned to or subsumed within the operation of other systems.

Additionally, it is contemplated that order input system 310 and/or fulfillment planning system 320 may interact with or implement various features of a number of other features not shown. For example, in one embodiment, order input system 310 may be configured to interact with accounting and billing systems in order to collect customer payments and update enterprise financial records to reflect the effects of transactions. In one embodiment, fulfillment planning system 320 may be configured to interact with additional systems that track the current state of inventory within network 200 and/or predict its future state (e.g., by predicting lead time for various items 35, accounting for items 35 that are inbound to network 200 but not yet received by nodes 210, or analyzing or predicting other network state variables). Fulfillment planning system 320 may also interact with other systems that model or estimate variables that may influence the planning process, such as the expected transit time for shipping from a particular node 210 to a customer via a particular carrier and/or shipping method.

Fulfillment Planning and Exact Algorithms

Implementing a sophisticated fulfillment network 200 that includes a variety of nodes 210 may enable an enterprise to scale its fulfillment capabilities and grow its business. For example, a large and diverse network 200 may enable an enterprise to serve a large number of dispersed customers more efficiently than a single fulfillment location would. However, as network 200 increases in complexity, so does the problem of deciding how individual orders should be assigned within network 200 for fulfillment (a task that may also be referred to as fulfillment planning or generating a fulfillment plan for an order). While the increased number of degrees of freedom afforded by a complex network 200 may increase the flexibility of fulfilling any particular order, they also may increase the difficulty of fulfilling orders in a way that satisfies order constraints while also minimizing the costs of order fulfillment.

For example, network 200 may include five nodes 210 that may be capable of fulfilling the items 35 specified in a given order. Further, there may exist several different options for shipping carriers from each node 210 (e.g., the United States Postal Service, private carriers such as UPS™, FedEx™, or DHL™, regional carriers, freight services, etc.) as well as different levels of shipping service available from individual carriers (e.g., overnight delivery, two-day delivery, ground service, Media Mail, etc.). Additionally, in some instances, there may be multiple paths, also referred to as outbound paths, that a given item 35 may take within a node 210 in preparation for shipment (e.g., a lower-cost item picking process that takes more time to complete vs. a higher-cost, expedited picking process).

In addition to these variables, there may be a number of constraints that apply to a particular order. For example, the customer may have been promised delivery of the ordered items 35 by a particular date. Further, various costs associated with the fulfillment process (e.g., labor associated with picking and preparing an item 35 for shipment, shipping costs, etc.) may affect the profitability of an order. Similarly, the availability of item 35 at various nodes 210, or lack thereof, may pose a constraint to order fulfillment. With a complex network 200, the fulfillment process for a given order becomes a problem with many different solutions, only some of which may achieve the various constraints applicable to the given order while reducing or minimizing costs.

Figure 4:
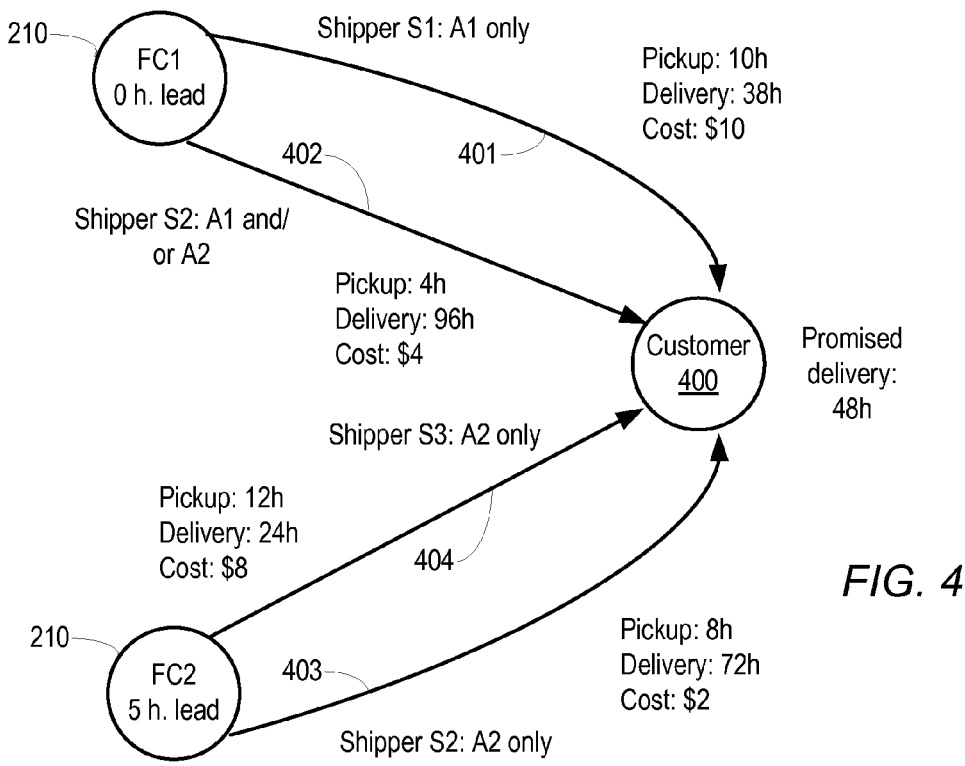
FIG. 4 illustrates an exemplary fulfillment planning scenario.

FIG. 4 illustrates the fulfillment planning complexity that may arise from an example scenario involving a small number of relatively well-constrained variables. This example presupposes that customer 400 has placed an order for two items 35, denoted A1 and A2, and has been promised that this order will be delivered within 48 hours of the time the fulfillment plan is being determined (i.e., the current time, for purposes of this example). Further, there are two nodes 210, denoted FC1 and FC2, from which the items may be sourced. FC1 has units of both A1 and A2, while FC2 has units of A2 only. In this example, FC1 is illustrated as having a picking lead time of 0 hours. Generally speaking, the picking lead time at a node 210 may represent the delay between the time fulfillment instructions are sent to the node 210 and the time at which action on those instructions is commenced. (In some embodiments, picking lead time for a node 210 may be estimated with respect to the time fulfillment instructions are completed at node 210 rather than commenced, and thus may include the time needed to actually carry out the instructions.) A picking lead time of 0 may indicate that there is no appreciable delay in fulfillment processing at FC1. By contrast, FC2 is illustrated as having a picking lead time of 5 hours, which may indicate that there is a backlog or delay in fulfillment processing at FC2 (e.g., due to a high volume of orders, equipment failure, personnel shortage, or some other cause). It is noted that in some instances, rather than being uniform within a node 210, the picking lead time at a node 210 may vary for different items 35.

The various options for shipping items 35 from FC1 and FC2 to the customer are illustrated in FIG. 4 as arcs 401-404. In this example, as depicted by arc 401, shipper S1 can ship only item A1 from FC1 (perhaps due to size or item type constraints with respect to item A2). Further parameters associated with arc 401 are that the next shipper pickup by S1 will occur in 10 hours, the item will be delivered by S1 to the customer in 38 hours, and the cost of shipping item A1 according to arc 401 is $10 per unit. As shown by arc 402, shipper S2 can ship either or both of items A1 and A2 from FC1 to the customer. The next shipper pickup by S2 is scheduled to occur in 4 hours for delivery in 96 hours at a cost of $4 per unit.

With respect to shipments of item A2 from FC2, two options are illustrated.

According to arc 403, item A2 may be shipped by carrier S2, with a next scheduled pickup to occur in 8 hours, delivery to occur in 72 hours, and a cost of $2 per unit. Finally, according to arc 404, item A2 may be shipped by carrier S3, with a next scheduled pickup in 12 hours, delivery to occur in 24 hours, and a cost of $8 per unit.

Casual inspection of FIG. 4 reveals a number of possible fulfillment plans even for the relatively simple problem of two items 35 and two nodes 210. For example, ignoring scheduling and cost constraints, the customer's order could be fulfilled entirely from FC1 using one or two shippers, or the order could be split for fulfillment across FC1 and FC2. Considering scheduling and cost constraints, it is evident that fulfillment plans that use certain arcs will not satisfy the customer's promised delivery deadline of 48 hours, while the costs of fulfillment plans that do satisfy the delivery deadline are considerably higher than the plans that do not. For example, one fulfillment plan that meets the customer's deadline is to ship item A1 according to arc 401 and item A2 according to arc 404, with a total shipping cost of $18. By contrast, the minimum cost plan (considering only the illustrated shipping costs) would involve shipping item A1 via arc 402 and item A2 via arc 403, for a total shipping cost of $6. This less expensive plan would exceed the customer's deadline by 24 hours for item A2 and 48 hours for item A1. Depending on the value assigned to customer goodwill, it may or may not be a sound business decision to trade off a doubling of the delivery timeframe against a two-thirds reduction in shipping cost, or vice versa.

In the foregoing example, the number of variables shown has been minimized to simplify presentation. In other embodiments, the fulfillment planning problem may involve numerous other costs and constraints, further examples of which are discussed in a subsequent section.

Broadly speaking, selection of various fulfillment variables—for example, what node(s) 210 to ship from, how to pick item(s) 35 within a node 210, and what shipping carrier (s) to use—so as to achieve constraints and goals presents a multi-variable discrete optimization problem with a potentially large solution space. It is noted that as used herein, the term "optimization" may refer to any suitable goal-seeking process in which the process objective is to achieve some target state or configuration of a system, whether exactly or approximately. Depending on the formulation of the problem being optimized, optimization may take the form of attempting to minimize or maximize a cost function within a solution space defined by the inputs and constraints of the problem. In different implementations, cost functions may be functions of one or several variables that may be scalars, vectors, or multidimensional matrices expressed in real or complex terms. In different contexts, the term "optimization" may refer to either global optimization, in which the identified solution is optimal with respect to the entire solution space, or local optimization, in which the identified solution may not be globally optimal but is optimal at least with respect to some portion of the solution space, which may or may not be deterministically bounded. Depending on the nature of the system being optimized, there may exist more than one solution under either global or local optimization. It is noted that any of the foregoing characteristics of optimization may be applicable to any of the particular embodiments discussed herein, and accordingly, the term "optimization" should be understood in a general rather than a limiting sense.

Exact algorithms for solving discrete optimization problems (i.e., algorithms that are guaranteed to find the best possible solution given the problem inputs) tend to be exhaustive in nature. For example, such algorithms typically involve constructing a tree or set representation of all possible solutions and then searching the representation for the solution that most closely satisfies problem constraints (e.g., minimizing shipping costs while meeting goals such as customer promise dates).

In some instances, the size of the search space may be reduced for a particular search by removing potential solutions that are not valid for that search. For example, a customer order may specify various items 35 that cannot be shipped by particular carriers or shipping methods due to some characteristic of the items 35 such as size, hazardous or perishable nature, or some other factor. When generating a search space in order to find a fulfillment plan for this order, it may be unnecessary to consider the carriers or shipping methods that cannot be employed for the order, which may reduce solution time. However, even with such improvements, exact solution algorithms for discrete optimization problems do not scale well as the complexity of the underlying network 200 increases. For example, the size of the exact algorithm solution space may grow exponentially both in the number of nodes 210 within the network and the number of items 35 in an order. Correspondingly, the overall computational effort (e.g., time) required to evaluate such algorithms may grow exponentially as these variables increase.

Moreover, while exact algorithms for solving a discrete optimization problem may guarantee that an optimal solution will be found if given enough time to work, the upper bound on solution time may be nondeterministic. That is, it may be impossible to know with certainty in advance how long an exact algorithm will take to generate a solution. Moreover, for some classes of exact algorithms, if the algorithm is prematurely terminated, the quality of the intermediate solution may be poor (i.e., there may be no guarantee that running the algorithm for at least some time T will yield a solution that is within some deterministically bounded error E of the best solution).

Thus, while an exact optimization algorithm for determining a fulfillment plan for an order may guarantee the quality of the generated plan—i.e., it may eventually identify the best possible plan given the costs and constraints applicable to the order—it may do so at the expense of the time required to arrive at the highest-quality solution. In some situations, the nondeterministic upper bound on solution time for exact algorithms may present operational difficulties for the system in which the discrete optimization problem arises. For example, an enterprise may seek to service a high volume of orders through its fulfillment network 200. Given finite computing resources, processing delays in determining fulfillment plans for individual orders may limit the overall rate at which order fulfillment may be completed, which may prevent the enterprise from reaching its service volume goals, may frustrate customers who may experience delays in processing their orders, or may have other deleterious consequences.

Heuristic Algorithms for Fulfillment Planning

In some order fulfillment situations, it may be more important for the overall operational goals of the enterprise (e.g., to meet order fulfillment volume goals, customer experience goals, etc.) to sacrifice the guarantee of identifying the best possible solution for greater assurance that an adequate solution can be identified quickly. That is, although an exact optimization algorithm may be guaranteed to identify the best fulfillment plan for an order, a less optimal plan may in fact be preferable if the additional cost of generating the best plan (e.g., in terms of additional computational effort) exceeds the cost savings between the best fulfillment plan and the less optimal plan (e.g., the degree to which the best plan improves upon the alternative). Generally speaking, heuristic optimization algorithms may yield results faster than exact algorithms, though at the possible expense of failing to identify the most optimal solution. However, a heuristic algorithm having a small and/or tolerably bounded rate of solution error relative to an exact solution may offer adequate accuracy for fulfillment planning with considerably less computational effort than an exact algorithm.

One general type of heuristic algorithm that may be applicable to the fulfillment planning problem may be referred to as a "greedy set partition" algorithm. Generally speaking, solving set partition problems may involve starting with an input set of set members and identifying those subsets of the input set that account for or "cover" all members of the input set while attempting to optimize a cost function associated with the resulting subsets. Collectively, the resulting subsets may be referred to as a "partition" of the input set. It is noted that in some instances, a subset may include all the members of its parent set. In contrast, a "proper subset" does not include all members of its parent set. In some instances, an optimal set partition of an input set may be the input set itself. That is, it may be the case that the initial grouping of the members of the input set is more cost-optimal than breaking the input set into smaller groups would be.

As applied to the fulfillment planning problem discussed above, the set partitioning approach may involve treating the original set of items 35 ordered by a customer as the input set, and treating the subsets of the input set as respective shipments to be sourced from corresponding nodes 210 of fulfillment network 200. That is, under the set partitioning approach, the set of items 35 ordered by a customer is the starting point for analysis, and the task of the solution algorithm is to identify how to partition the items into one or more subsets for shipment, where each item in the order is accounted for (i.e., covered) by the resulting subset(s), and where the resulting subset(s) generally optimize (in the broad sense discussed above) the applicable cost function. As noted above, it is possible that given the various constraints at hand, grouping all of the items 35 in the original order together as a single shipment may be the most desirable option.

In the context of the fulfillment planning problem, set partitions may be distinguished not only by the items 35 that are assigned to a particular subset, but by the other free variables in the problem. That is, shipments of a given item 35 from different nodes 210 in the network 200, or according to different shipping methods or carriers, or according to different values of any other fulfillment variable may each be considered distinct partitions or assignments of the given item 35. For example, considering the scenario illustrated in FIG. 4, there exist a number of possible partitions of the input set of items A1, A2 ordered by the customer in view of the fulfillment options represented by arcs 401-404. Shipper S2 could ship both items A1 and A2 from node FC1, either together in one shipment or in two distinct shipments, which presents two possible partitions. Shipper S1 could ship item A1 from FC1, and item A2 could be shipped from either FC1 via shipper S2, or from FC2 via either shippers S2 or S3, which presents three additional partitions. Finally, shipper S2 could ship item A1 from FC1, and item A2 could be shipped from FC2 via either shippers S2 or S3, which presents two further partitions.

Before considering approaches for performing a set partitioning optimization in the context of fulfillment planning, it is helpful to consider the types of factors that may contribute to the fulfillment cost function (or simply, cost function) that is subject to optimization. It is noted that while in some cases, the cost function may be expressed as a single mathematical expression or equation, in other instances, "cost function" may refer to any suitable collection of expressions involving the relevant cost factors. For example, the cost function may be represented by a system of equations.

In some instances, the cost function may involve costs that are primarily economic in nature. For example, if a customer orders an item 35 that is not already within an enterprise's own inventory (e.g., stored within a fulfillment center 10 within fulfillment network 200), there may be an incremental cost associated with instructing a third party (e.g., a drop shipper) to ship the item to the customer, which may be referred to as the "item cost." If the item 35 is located within an enterprise's own inventory, there may be a labor cost associated with retrieving the item 35 from inventory and preparing it for shipment, which may be referred to as "outbound fulfillment costs." In various instances, the cost of materials used in the fulfillment process (e.g., boxes, packing materials, promotional inserts, etc.) may be modeled alternatively as a discrete "materials cost," incorporated into another cost, or ignored. Other primarily economic costs that may be included in the cost function are possible and contemplated.

Some aspects of the cost function may implement various constraints or business policies that may not be expressed in purely financial terms, but which nonetheless may affect the quality of a fulfillment plan solution. For example, absent a contractual obligation, failing to ship according to the deadlines promised to the customer might not incur an immediate financial cost to an enterprise. However, such broken promises might negatively affect customer goodwill, which may result in future financial costs if the customer decides to do business elsewhere or advises others to do the same. Therefore, in some embodiments, violation of constraints or business policies may carry a cost that is expressed in the cost function. These types of costs may be indicative of policy choices that reflect the relative weight or importance of a particular constraint in the general decision analysis. For example, the cost of violating a promise to a customer may be selected such that the promise is violated only when the cost of keeping the promise would be prohibitive. Such prohibitive costs may occur, for example, when there exists no fulfillment plan that could satisfy the promise under any circumstances, or when a fulfillment plan that could satisfy the promise would be so expensive that the direct financial cost of the plan cannot be justified in view of the inchoate customer goodwill that would be preserved by keeping the promise.

Generally speaking, any suitable problem constraint, business rule, or policy may be reflected in the optimization cost function via one or more representative costs. In addition to costs associated with violating customer promises that are discussed above, the cost function may reflect the enterprise's internal operating policies. For example, if one node 210 of fulfillment network 200 has a backlog of fulfillment requests while another node 210 is relatively idle, it may be desirable to shift fulfillment work from the busy node to the idle node in order to better utilize the resources of network 200. In one embodiment, this type of load balancing may be achieved by implementing a cost that favors shifting fulfillment activity to less busy nodes 210, subject to other relevant constraints. For example, such a cost may be implemented and updated in a dynamic fashion, such that it represents the state of network 200 at a given time or within a period of time. Nodes 210 that are more heavily utilized may be associated with a higher cost, while nodes 210 that are less heavily utilized may be associated with a lower cost.

It is noted that not all fulfillment planning policies or constraints need necessarily be implemented via the cost function. In some instances, potential fulfillment plans that would violate one or more constraints might be eliminated from the set of possible solutions before any optimization work is performed. For example, if a particular shipping method or carrier is simply not available for a particular item 35, that option may be eliminated from consideration regardless of its effect on the cost function. Such "pruning" techniques may be particularly effective when a constraint is binary in nature (e.g., either satisfied or not satisfied), although this is not a prerequisite. Generally speaking, any constraint that may be implemented through pruning of the solution space may equivalently be implemented via the cost function.

In some embodiments, in order to facilitate implementation of the solution algorithm, the cost function may implement hidden costs, which may also be referred to as dummy or default costs. For example, in some instances, it may be impossible to find a fulfillment plan that satisfies all applicable constraints with realistic costs. In order to ensure that the solution algorithm reliably terminates in such exceptional cases, in one embodiment, a "last chance" fulfillment plan may be included within the solution space and associated with a hidden cost that is sufficiently high to ensure that the last chance plan is selected only in the event that there are no other viable alternative plans. The last chance plan may also be associated with few or no constraints aside from the large hidden cost, which may ensure that the last chance plan will be an eligible solution if there are no alternatives. This approach may ensure that at least one fulfillment plan within the solution space is algorithmically achievable. If the last chance fulfillment plan is the end result selected by the solution procedure, this may indicate that there is no realistically feasible fulfillment plan for the input conditions and may signal that some intervention is required (e.g., cancellation of the order, notification of the customer, notification of customer service personnel, etc.).

Figure 5:
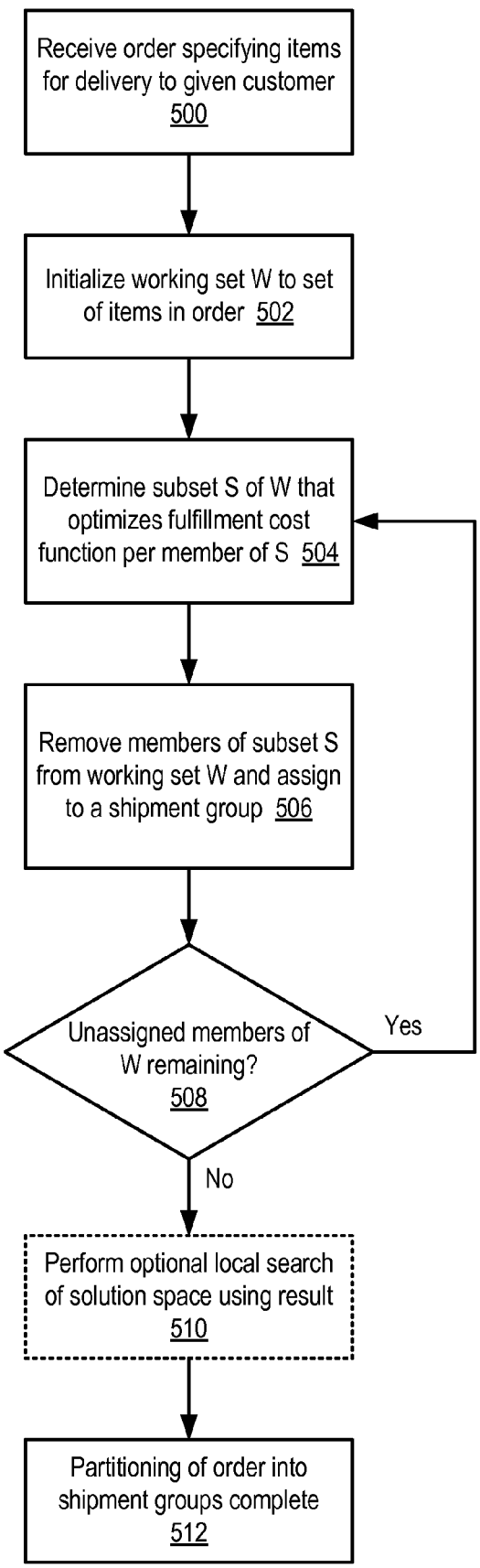
FIG. 5 is a flow diagram illustrating one embodiment of a method of operation of a computer system that is configured to generate a fulfillment plan according to a greedy set partition algorithm.

FIG. 5 illustrates one embodiment of a method of operation of a computer system that is configured to implement a greedy set partition algorithm to generate a fulfillment plan for a customer order. For example, various embodiments of the illustrated method may be implemented by fulfillment planning system 320, described above.

In the illustrated embodiment, operation begins in block 500 where an order specifying a number of items 35 for delivery to a given customer is received. For example, such an order may be received by fulfillment planning system 320, either directly from the given customer or via another system such as order input system 310. In some instances, the order may specify multiple units of a single item 35, while in other cases, the order may specify one or more units of each of multiple different items 35. In some embodiments, the order may be an electronic document that completely specifies all items 35 in the order, the details necessary to ship the order (e.g., the customer's shipping address), and an indication of any constraints or conditions applicable to the order (e.g., shipping or delivery date promises made to the customer). In other cases, some of these items of information may be obtained from various different sources. For example, a shipping address for a returning customer may already be on record within a database, and may be retrieved from that database rather than specified directly in the received order.

Broadly speaking, the greedy set partition algorithm operates iteratively over a working set (W) of items 35 until all of the items in the working set have been assigned to a partition that includes one or more subsets. As noted above, in the context of the fulfillment planning problem, each subset of the resulting partition may correspond to a respective shipment that may be sourced from a node 210 of fulfillment network 200. Accordingly, the subsets of the partition resulting from the greedy set partition algorithm may also be referred to as shipment groups. That is, a shipment group may include one or more items 35 specified in the given customer's order that are grouped together as a single shipment (e.g., are placed in a single shipping container or are otherwise joined for shipping purposes).

Initially, the working set W contains those items 35 specified by the given customer's order, while the resulting partition includes no items (block 502). That is, initially, no items 35 from the given customer's order have yet been assigned to a shipment group.

The algorithm proceeds by determining a subset (S) of working set W that optimizes the fulfillment cost function C(S) per member of subset S (block 504). That is, subset S is determined such that C(S)/|S| is optimized, where |S| denotes the cardinality of subset S (i.e., the number of members of subset S). As described above, fulfillment cost function C(S) may be any expression or set of expressions of costs representative of the various financial costs of shipping subset S, the costs of compliance/noncompliance of subset S with various business rules, policy preferences, or problem constraints, or any other factor that may influence the quality of solution or distinguish one fulfillment plan from another.

In some embodiments, optimization of the cost function C(S) may entail minimization of C(S). However, as noted above, optimization may also refer to other goal-directed approaches such as maximization, zero-seeking, or other types of goal-seeking behavior. It is further noted that many of these goal-directed approaches may be functionally interchangeable. That is, a minimization problem may be converted to a maximization or other type of optimization problem through suitable transformations of the cost function, such as by inverting, negating, or otherwise transforming the cost function and/or its individual terms or elements. For example, a cost minimization problem may be alternatively be cast as a profit maximization problem, or vice versa.

Once the membership of subset S has been determined such that C(S) has been optimized as described above, the members of subset S are removed from the working set W and assigned to a shipment group within the result partition (block 506). If there remain members of working set W that have not been assigned to a shipment group within the result partition (block 508), operation may proceed from block 504.

Otherwise, an optional local search of the solution space may be performed using the result partition (block 510). In various embodiments, the optional local search may seek nearby solutions within the solution space that improve upon the result partition, such as by employing factors or constraints not represented by the cost function C(S). For example, the local search procedure may use information about other planned shipments that were not previously accounted for (such as other planned shipments from the same node 210 at different times, or planned shipments from different nodes 210) to determine whether other planned shipments may be feasibly combined with a shipment group in the result partition to yield a further cost savings. Generally speaking, the optional local solution space search may further improve the result partition by refining the membership of shipment groups.

Upon assignment of all members of the working set W to a shipment group in the result partition, and optionally upon completion of the local search, the partitioning of the given customer's order into one or more shipment groups may be complete (block 512). In various embodiments, fulfillment planning system 320 may then take steps necessary to carry out fulfillment of the given customer's order according to the resulting fulfillment plan, for example by conveying fulfillment instructions to the various nodes 210 that are consistent with the shipment groups generated by the set partition algorithm.

Improving Heuristic Fulfillment Planning Performance

Performance of the greedy set partition algorithm may generally depend upon the strategy employed to implement the cost function optimization that is used to identify shipment groups. Conventional optimization strategies may treat the cost function and/or its elements as a "black box" about which little is known. For example, optimization may be performed in the absence of knowledge about the underlying structure of the cost function, such as whether the cost function is linear, polynomial, or exponential, where the maxima/minima or inflection points of the cost function are located, or any other details of the cost function beyond how the cost function is to be computed for a set of inputs. Lacking such insight into the behavior of the cost function, black box optimization strategies typically must explore a good deal of the solution space in order to identify an optimal solution, which may correspondingly require considerable computational effort.

However, in the context of the fulfillment planning problem, some details regarding the structure of the cost function may be available, and these details may be exploited to improve the performance of optimizing the cost function. In one embodiment, the costs associated with processing and shipping a shipment from a node 210 of fulfillment network 200 to a customer may be separable into a fixed portion that is invariant with respect to the shipment and a variable portion that varies according to some attribute or combination of attributes of the shipment, such as shipment weight.

Figure 6:
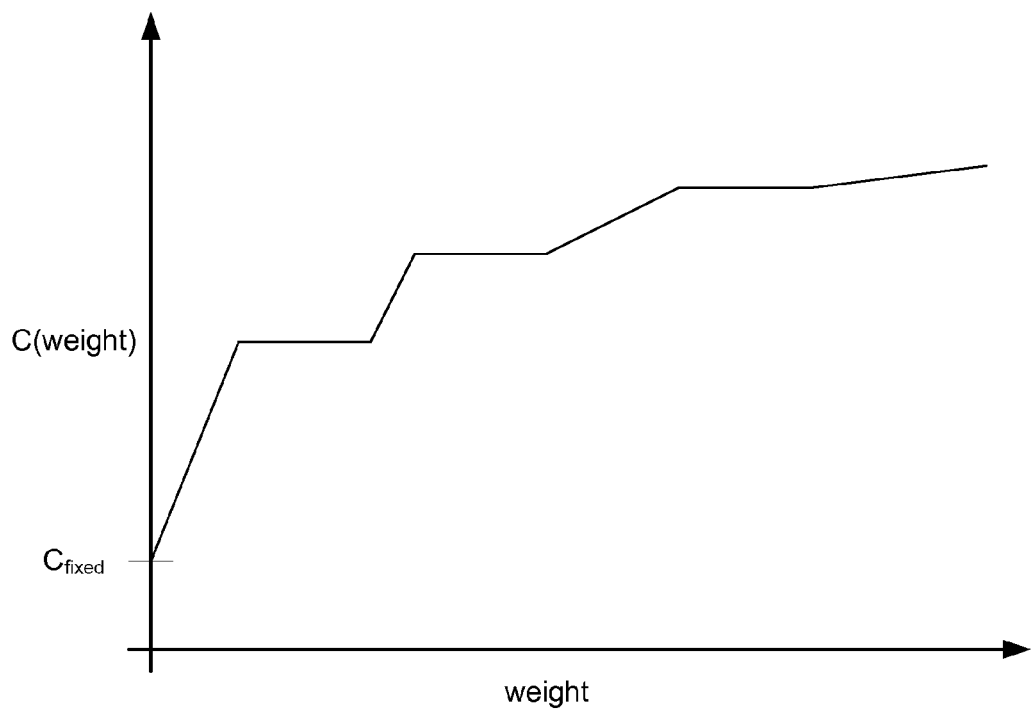
FIG. 6 illustrates an exemplary piecewise linear concave cost function.

Further, in some embodiments, these fixed and variable costs may be accurately approximated by a piecewise linear, nondecreasing function having a nonzero intercept. One example of such a function is illustrated in general form in FIG. 6. The piecewise linear cost function of FIG. 6 is shown as a function of shipment weight, although in other embodiments, the piecewise linear cost function may be a function of additional and/or different factors. For example, the piecewise linear cost function may be a function of an index that in turn takes into account factors such as shipment dimensions and/or package shape in addition to weight. In the illustrated embodiment, the fixed portion of the piecewise linear cost function may correspond to the y-intercept value $C_{fi}$ xed, while the variable portion may correspond to that part of the cost function that exceeds $C_{fixed}$. Generally speaking, a piecewise linear cost function may be composed of one or more linear segments. In the illustrated embodiment, a number of linear segments are shown, some of which have zero slope and others of which have nonzero slope. In other embodiments, it is contemplated that all segments of the piecewise linear cost function may uniformly have either zero slope or nonzero slope. Piecewise linear cost functions in which the slope of each segment of the cost function is less than the slope of the preceding segment may also be referred to as concave piecewise linear cost functions.

In some embodiments, separate piecewise linear cost functions may exist for different shipping methods, different nodes 210 from which shipments originate, different fulfillment paths within a particular node 210 (e.g., manual vs. automated fulfillment paths), or any combination of these or other decision variables. In other embodiments, fewer piecewise linear cost functions may be employed, and those employed may have broader applicability (e.g., a particular piecewise linear cost function might apply to all shipments from a particular node 210 regardless of other variables). Additionally, it is contemplated that different aspects of the general fulfillment cost function discussed above may be implemented by corresponding piecewise linear cost functions or sets of such functions. For example, fulfillment costs purely related to shipping (such as fees charged by carriers) may be implemented using one set of piecewise linear cost functions, while fulfillment costs related to labor (such as costs to pick and process items 35 in preparation for shipment) may be implemented using another set of piecewise linear cost functions.

Figure 7:
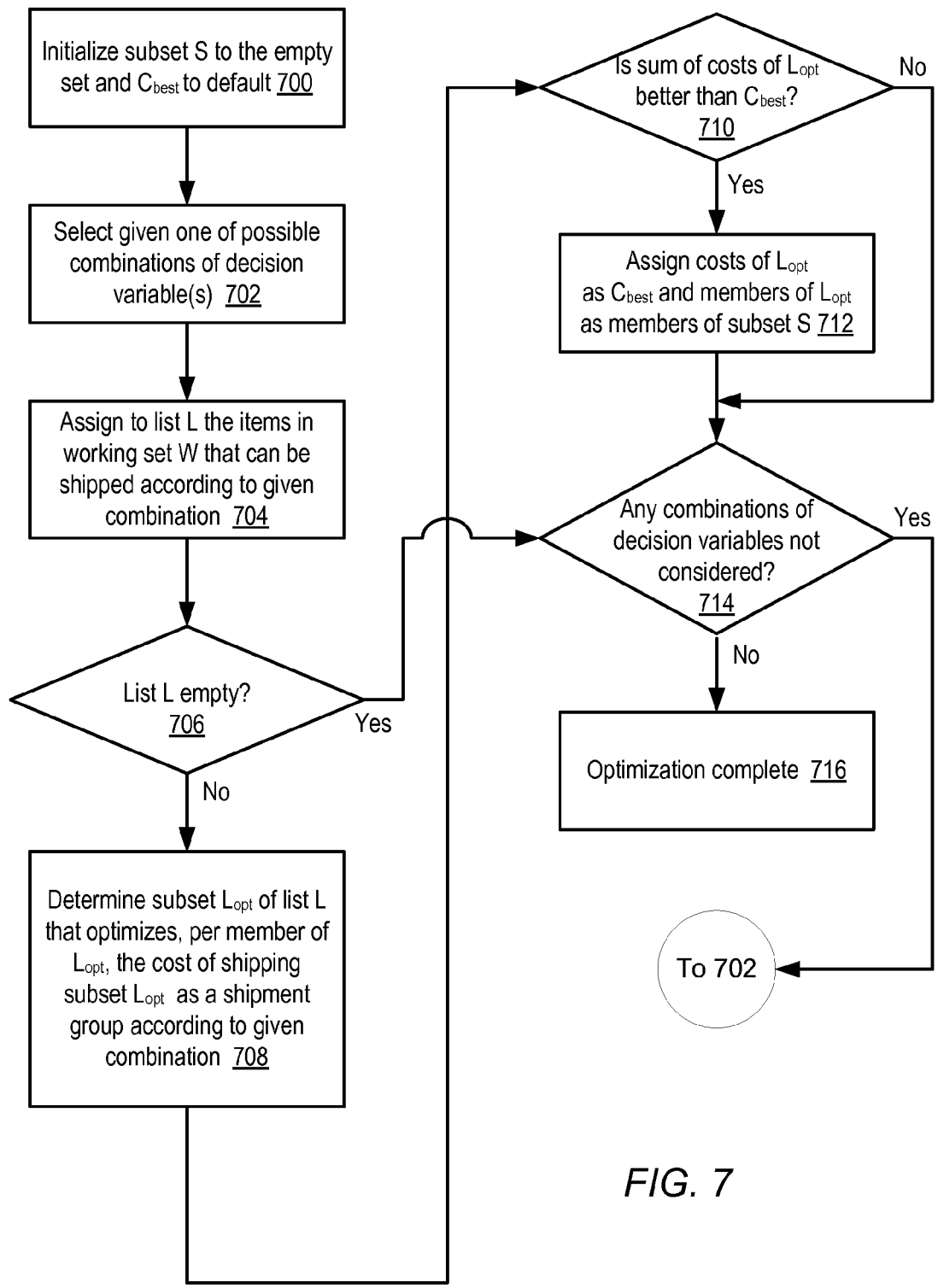
FIGS. 7 & 8 are flow diagrams illustrating one embodiment of a method of operation of a computer system that is configured to exploit the fixed-plus-variable structure of a fulfillment cost function to perform cost function optimization.

One embodiment of a method of operation of a computer system that is configured to exploit the fixed-plus-variable structure of a fulfillment cost function in order to optimize that cost function is illustrated in FIG. 7. In some embodiments, the method of FIG. 7 or a suitable variant thereof may be employed to implement the cost function optimization element of the greedy set partition algorithm, shown as block 504 in FIG. 5. For example, the method of FIG. 7 might be implemented by fulfillment planning system 320 as a subroutine or function that may be invoked during operation of the greedy set partition algorithm.

Generally speaking, like the greedy set partition algorithm described above, the cost function optimization algorithm of FIG. 7 may be iterative in nature. Thus, inclusion of the method of FIG. 7 within the method of FIG. 5 may yield multiple distinct levels of nested iteration. However, in one embodiment, the manner in which iteration occurs may differ for the two methods. As described above, the greedy set partition algorithm iterates over the working set W of items 35 of an order that have not yet been assigned to a shipment group. By contrast, the cost optimization algorithm of FIG. 7 may iterate over the possible combinations of decision variables that fully specify how a particular shipment occurs for a shipment group. In general, these decision variables may represent those free variables in the fulfillment planning problem whose values need to be determined, subject to optimization of the fulfillment cost function, in order to complete a shipment.

For example, for any given shipment group of one or more items 35, it may be necessary to choose a node 210 from which to ship or source the shipment group. It may also be necessary to decide what particular shipping carrier and/or method will be used to ship the shipment group. In some cases, there may exist different outbound paths within a node 210 that represent different ways in which a shipment group may be retrieved from inventory and prepared for shipment. For example, within a given node 210, there may exist the possibilities of retrieving items 35 manually or using automated techniques, retrieving items 35 according to different priority schemes, packaging items 35 manually or using one of a variety of mechanical devices, or other alternatives, any combination of which may be referred to as an outbound path that a shipment group undergoing fulfillment might take within a node 210.

Correspondingly, in one embodiment, respective indications of the sets of fulfillment nodes 210, shipping methods, and outbound paths may each represent discrete (e.g., countable and finite) decision variables of the fulfillment planning problem. As such, these variables may represent the parameters that are available to be tuned in order to achieve the objectives represented by optimization of the fulfillment cost function (e.g., meeting customer expectations while minimizing fulfillment costs). In instances where particular values of a decision variable correspond to members of a set, the decision variable may be referred to as the set itself. For example, the set F that has all fulfillment nodes 210 as its members may be referred to as a decision variable that, when evaluated, identifies a particular one of fulfillment nodes 210.

It is noted that the decision variables mentioned here are merely exemplary, and in other embodiments, more, fewer, or different decision variables may be employed. For example, in one embodiment, the choice of node 210 may be the sole decision variable considered.

In one embodiment, the cost function optimization algorithm of FIG. 7 may iterate over the discrete set of possible combinations of values given by the decision variables that are employed by the fulfillment planning problem. For example, suppose there are a total of five nodes 210, five shipping methods and three outbound paths from which to choose for any given shipment group. If all three decision variables are independent of one another, there may exist 75 combinations in the set of possible combinations of these decision variables. However, it is noted that decision variables need not be independent of one another. For example, the availability of certain shipping methods and/or outbound paths may vary depending on which node 210 is being considered. It is noted that in an embodiment where only one decision variable is employed, the set of possible combinations of values of the decision variables may be the same as the set of possible values of the one decision variable that is employed.

Also, it is contemplated that the validity of certain combinations of decision variables may depend on circumstances such as the type of item or the state of fulfillment network 200. For example, some combinations of decision variables may be invalid for certain types of items 35, and thus may be inapplicable to shipment groups containing such types of items. In another instance, certain combinations of decision variables may be unavailable due to equipment failure or maintenance that affects certain nodes 210 or outbound paths within nodes 210, due to logistical issues (e.g., weather delays) that prevent certain shipping methods, or due to any other transient circumstance. In some embodiments, invalid combinations of decision variables may be excluded from the set of possible combinations of decision variables before the cost function optimization algorithm commences iterating. In other embodiments, validity checks may be built into the algorithm, such that invalid combinations of decision variables may be skipped during the iteration process.

As described above with respect to the greedy set partition algorithm, the objective of the cost function optimization algorithm may be to identify the subset S of the as-yet-unassigned items in working set W that optimize the fulfillment cost function C(S) per item within subset S. Operation of the cost function optimization algorithm begins in block 700, where the subset S initially contains no items, and a current best cost ($C_{best}$) is set to a default value, which may be chosen dependent upon the optimization strategy. For example, if the optimization strategy is to minimize the cost function, $C_{best}$ may initially be set to a maximum possible value, such as a representation of infinity. If the optimization strategy is to maximize a utility or profit function, $C_{best}$ may initially be set to a minimum possible value, such as zero.

A given one of the possible combinations of decision variables is then selected (block 702). Numerous representations of the decision variable combination space and techniques for its traversal are possible and contemplated. For example, the algorithm may iterate over each decision variable in a hierarchical fashion using a number of nested iterators (e.g., nested for-loops or while-loops). Alternatively, each combination of decision variables may be represented by a corresponding entry in a one-dimensional iterator, for example by using loop unrolling techniques to generate an array or vector of decision variable combinations. However, any other suitable manner of representing and traversing the possible combinations of decision variables may be employed. Selection of the next combination of decision variables to be analyzed may be performed in an ordered or arbitrary fashion. Further, it is contemplated that in some embodiments, the iteration process over the possible combinations of decision variables may be decomposed into parallel processes that may be executed concurrently on systems that provide resources for parallel execution (e.g., multiprocessor and/or multicore systems).

Next, items 35 that are in working set W (i.e., items not yet assigned to a shipment group by the greedy set partition algorithm) and which can be shipped according to the given combination of decision variables may be assigned to a list (L) (block 704). For example, various business rules, policies, or the current operational state of portions of network 200 may dictate that some items 35 cannot be shipped from certain nodes 210, via certain shipping methods, or via certain outbound paths within a node 210. Given these constraints, those items in working set W that may permissibly be shipped according to the particular configuration of decision variables being analyzed in a given iteration may be assigned to list L. If there are no such items in working set W (block 706), analysis of the given combination of decision variables may terminate and operation may proceed from block 714 where it is determined whether there exists another combination that has not yet been considered.

The subset ($L_{opt}$) of list L is then determined that optimizes, per member of subset $L_{opt}$, the cost of shipping a shipment group according to the given combination of decision variables (block 708). In one particular embodiment, this subset may be determined by identifying the subset that optimizes, per member of subset $L_{opt}$, the sum of: the fixed costs of shipping a shipment group according to the given combination of decision variables, and the variable costs of shipping subset $L_{opt}$ as a shipment group according to the given combination of decision variables. That is, for the list L of items that may permissibly be shipped according to the given combination of decision variables, the subset $L_{opt}$ of list L that optimizes the fixed and variable costs of shipping according to the given combination of decision variables is determined. In various embodiments, as noted above, such optimization may involve maximization, minimization, or other goal-seeking procedures.

Once the membership of subset $L_{opt}$ has been determined, if the sum of the fixed and variable costs of subset $L_{opt}$ is more optimal than the current best cost $C_{best}$, then $C_{best}$ may be set to the sum of the fixed and variable costs of subset $L_{opt}$, and the members of subset $L_{opt}$ may be assigned as the members of the output subset S (blocks 710-712). For example, in a minimization context, once subset $L_{opt}$ has been identified as locally optimal within the context of list L, the cost of subset $L_{opt}$ may be compared against the cost $C_{best}$ of the best alternative grouping of items seen thus far. If the cost of subset $L_{opt}$ is lower than the cost of best current alternative, then $L_{opt}$ may be selected as the new best solution against which future iterations should be judged.

If there remain any combinations of decision variables that have not yet been considered (block 714), then operation may proceed from block 702 where a new given combination of decision variables may be selected. Otherwise, the cost function optimization algorithm may terminate (block 716). Thus, the algorithm may iteratively progress through the various possible combinations of decision variables to identify the optimal membership of subset S.

Figure 8:
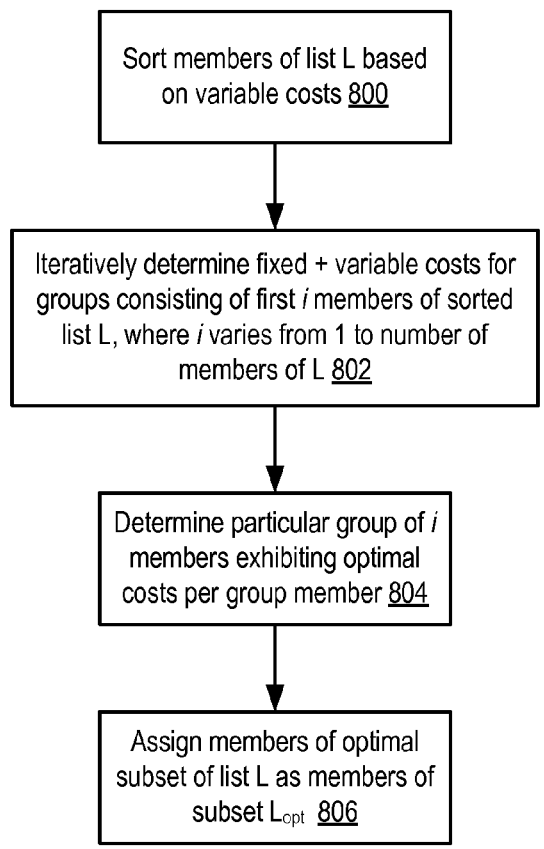

In one embodiment, determination of subset $L_{opt}$ in block 708 may be implemented according to the method shown in FIG. 8. Operation of the method of FIG. 8 begins in block 800, where the members of list L are sorted in ascending order based on their variable costs. Then, the fixed plus variable costs applicable to the first i members of sorted list L may be iteratively determined by varying i from 1 to the number of members of list L (denoted |L|) (block 802). That is, during the first iteration, the costs associated with shipping the first member of sorted list L as a shipment group may be determined. During the second iteration, the costs associated with shipping the first and second members of sorted list L as a shipment group may be determined, and so on until a total of |L| groups have been considered.

The particular one of these |L| groups that exhibits optimal (e.g., minimal) costs per group member may be determined (block 804), and the members of this optimal subset of list L may be assigned as the members of subset $L_{opt}$ (block 806). In some embodiments, determining the optimal subset of list L may be performed during the course of the iteration in a manner similar to that described above with respect to FIG. 7. For example, an interim best value may be used as a placeholder for the best intermediate solution for $L_{opt}$ that is currently known, and the placeholder value may be replaced if a subsequent iteration reveals a better solution.

It is noted that according to this embodiment, not every possible combination of the members of list L may be considered when attempting to find the subset $L_{opt}$ that optimizes cost per member. Rather, only those groups that include the members of L that have the lowest individual costs may be considered. In some instances, this may substantially reduce the amount of effort required to determine $L_{opt}$ relative to embodiments that consider all possible combinations of members of list L, without considerable sacrifices in the quality of the result. However, it is noted that any other suitable optimization strategy may be employed to determine $L_{opt}$, including strategies that consider all combinations of list L or strategies that implement other heuristic approaches.

Exemplary Computer System Embodiment

It is contemplated that in some embodiments, any of the methods or techniques described above may be implemented as program instructions and data capable of being stored on a computer-accessible storage medium and executed or manipulated by a processor. Such methods or techniques may include, for example and without limitation, the functions of inventory management system 50, order input system 310, fulfillment planning system 320, as well as the methods illustrated in FIGS. 5, 7, and 8 and any suitable variations thereof. Such program instructions may be executed to perform a particular computational function, such as the greedy set assignment algorithm, the fulfillment cost optimization algorithm, general optimization or solution functions, database functions, operating system functionality, applications, and/or any other suitable functions.

Figure 9:
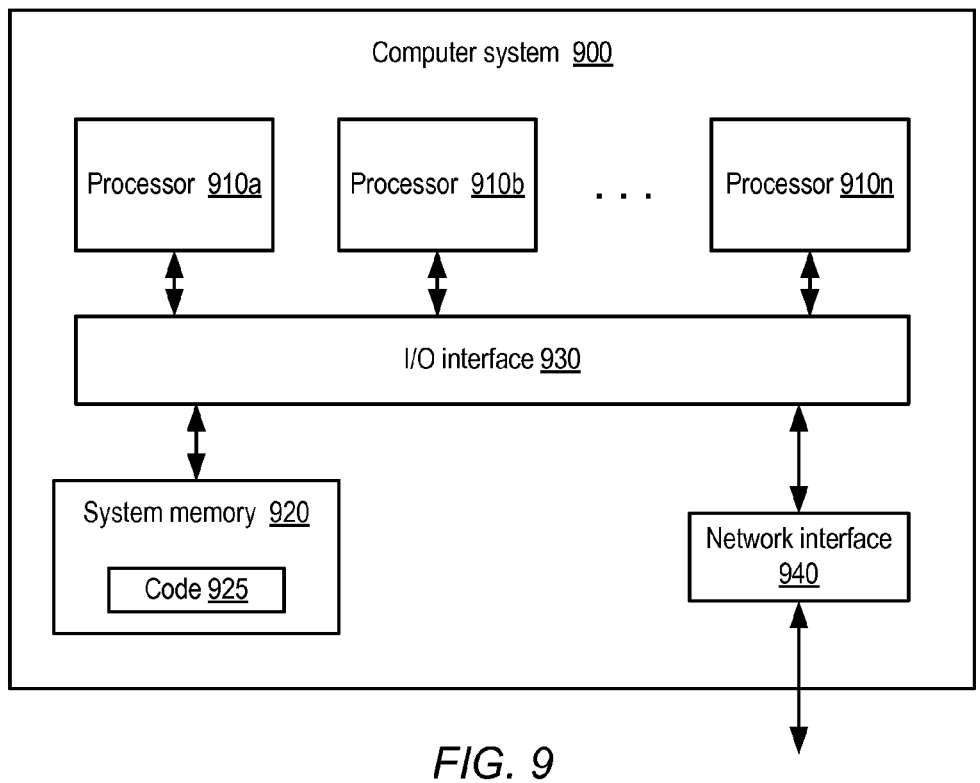
FIG. 9 is a block diagram illustrating an exemplary embodiment of a computer system.

One exemplary embodiment of a computer system including computer-accessible media is illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. In some embodiments, it is contemplated that inventory management system 50 may be implemented using a single instance of computer system 900, while in other embodiments multiple such systems may be configured to host different portions or instances of inventory management system 50. For example, in one embodiment some data sources or services (e.g., purchasing management services) may be implemented via instances of computer system 900 that are distinct from those instances implementing other data sources or services (e.g., order entry/fulfillment services).

In various embodiments computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by process 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible storage medium configured to store program instructions and data as described above. However, in other embodiments, program instructions and/or data may be stored upon different types of computer-accessible media. Generally speaking, a computer-accessible storage medium may include media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Program instructions and data stored via a computer-accessible storage medium may be transmitted by transmission media or signals such as electrical, electromagnetic, or digital signals, which may be conveyed via a communication medium such as a network and/or a wireless link, such as may be implemented via network interface 940.

It is noted that the order of operation described above with respect to various methods and techniques discussed above has been chosen to facilitate exposition, but does not necessarily represent the only order of operation that is possible. In cases where the elements of a method are independent of one another, it is contemplated that such elements may be performed in any suitable order, and the foregoing discussion should be regarded as merely exemplary and not restrictive.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
receiving, by one or more computers, an order specifying a plurality of items for delivery to a given customer;
iteratively partitioning, by one or more computers, said plurality of items to assign each of said plurality of items into one of one or more shipment groups, wherein prior to said partitioning, a working set (W) of items in said order remaining to be assigned to a shipment group includes each of said plurality of items; and
outputting, by one or more computers, an instruction that said one or more shipment groups be shipped to said given customer;
wherein each of said one or more shipment groups is respectively designated to be shipped from a respective one of a plurality of nodes within a fulfillment network, wherein each iteration of said partitioning comprises:
for the working set W of items in said order remaining to be assigned to a shipment group, determining a subset (S) of said working set W that optimizes: a fulfillment cost function for said subset S, divided by a number of items of said subset S;
assigning said subset S to a respective shipment group; and
removing said subset S from said working set W;
wherein determining said subset S comprises iterating over multiple combinations of values for one or more decision variables, wherein each combination of said multiple combinations includes one or more values indicative of a particular node of said plurality of nodes, and wherein performing each iteration for a given combination of values of said multiple combinations of values comprises:
generating a list (L) of items of working set W that can permissibly be shipped according to conditions represented by said given combination of values;
determining a subset ($L_{opt}$) of list L that optimizes, under the conditions represented by said given combination of values: a cost of shipping a shipment group of the subset $L_{opt}$, divided by the number of items in the subset $L_{opt}$;
if the cost of shipping said shipment group of said subset $L_{opt}$ is more optimal than a current best cost $C_{best}$, assigning said items of said subset $L_{opt}$ as the items of said subset S and assigning said cost of shipping said shipment group as said current best cost $C_{best}$, and if the cost of shipping said shipment group of said subset $L_{opt}$ is not more optimal than the current best cost $C_{best}$, leaving said subset S and said current best cost $C_{best}$ unchanged;

wherein prior to iterating over said multiple combinations of values, said subset S is empty and said current best cost $C_{best}$ is a default value.

2. The computer-implemented method as recited in claim 1, wherein said cost of shipping a shipment group of the subset $L_{opt}$ equals the sum of: fixed costs of shipping said shipment group according to said given combination of values, and variable costs of shipping said shipment group including the members of the subset $L_{opt}$ according to said given combination of values.

3. The computer-implemented method as recited in claim 2, further comprising sorting members of list L according to respective variable costs of shipping of said members of list L prior to determining said subset $L_{opt}$ of list L.

4. The computer-implemented method as recited in claim 3, wherein determining said subset $L_{opt}$ comprises:

for an integer i ranging from 1 to the number of members of list L, identifying a particular subset (P) of list L, wherein the particular subset P consists of the first i members of list L, and wherein the particular subset of P optimizes, under the conditions represented by said given combination of values, the following calculation: ((the sum of: fixed costs of shipping a shipment group according to said entry of said iterator, and variable costs of shipping a shipment group including the members of the subset $L_{opt}$), divided by the number of items in said subset P); and assigning members of particular subset P as members of subset $L_{opt}$ of list L.

5. The computer-implemented method as recited in claim 1, further comprising evaluating one or more piecewise linear cost functions to determine said cost of shipping a shipment group.

6. The computer-implemented method as recited in claim 1, wherein determining said subset S comprises determining a particular candidate subset of said working set W that minimizes: (said fulfillment cost function for said particular candidate subset, divided by a number of items of said particular subset).

7. The computer-implemented method as recited in claim 1, wherein said plurality of nodes comprises one or more fulfillment centers.

8. The computer-implemented method as recited in claim 1, wherein said plurality of nodes comprises one or more drop shippers.

9. The computer-implemented method as recited in claim 1, wherein said one or more decision variables include a set indicative of a plurality of shipping methods provided by one or more shipping carriers.

10. The computer-implemented method as recited in claim 1, wherein said one or more decision variables include a set indicative of a plurality of outbound paths within one or more of said nodes of said fulfillment network.

11. The computer-implemented method as recited in claim 1, further comprising:

prior to iterating over said multiple combinations of values for said one or more decision variables, excluding one or more possible combinations of values of said one or more decision variables from said multiple combinations of values.

12. The computer-implemented method as recited in claim 1, further comprising:

prior to outputting said instruction that said one or more shipment groups be shipped to said given customer, performing a local solution space search that refines membership of said one or more shipment groups.

13. A non-transitory computer-accessible storage medium storing program instructions, wherein the instructions are computer-executable to implement operations comprising:

receiving an order specifying a plurality of items for delivery to a given customer;

iteratively partitioning said plurality of items to assign each of said plurality of items into one of one or more shipment groups, wherein prior to said partitioning, a working set (W) of items in said order remaining to be assigned to a shipment group includes each of said plurality of items; and outputting that said one or more shipment groups be shipped to said given customer;

wherein each of said one or more shipment groups is respectively designated to be shipped from a respective one of a plurality of nodes within a fulfillment network, wherein each iteration of said partitioning comprises:

for the working set W of items in said order remaining to be assigned to a shipment group, determining a subset (S) of said working set W that optimizes: a fulfillment cost function for said subset S, divided by a number of items of said subset S;

assigning said subset S to a respective shipment group; and removing said subset S from said working set W;

wherein determining said subset S comprises iterating over multiple combinations of values for one or more decision variables, wherein each combination of said multiple combinations includes one or more values indicative of a particular node of said plurality of nodes, and wherein performing each iteration for a given combination of values of said multiple combinations of values comprises:

generating a list (L) of items of working set W that can permissibly be shipped according to conditions represented by said given combination of values;

determining a subset ($L_{opt}$) of list L that optimizes, under the conditions represented by said given combination of values: a cost of shipping a shipment group of the subset $L_{opt}$, divided by the number of items in the subset $L_{opt}$;

if the cost of shipping said shipment group of said subset $L_{opt}$ is more optimal than a current best cost $C_{best}$, assigning said items of said subset $L_{opt}$ as the items of said subset S and assigning said cost of shipping said shipment group as said current best cost $C_{best}$, and if the cost of shipping said shipment group of said subset $L_{opt}$ is not more optimal than the current best cost $C_{best}$, leaving said subset S and said current best cost $C_{best}$ unchanged;

wherein prior to iterating over said multiple combinations of values, said subset S is empty and said current best cost $C_{best}$ is a default value.

14. The non-transitory computer-accessible storage medium as recited in claim 13, wherein said cost of shipping a shipment group of the subset $L_{opt}$ equals the sum of: fixed costs of shipping said shipment group according to said given combination of values, and variable costs of shipping said shipment group including the members of the subset $L_{opt}$ according to said given combination of values.

15. The non-transitory computer-accessible storage medium as recited in claim 14, wherein the operations further comprise:
sorting members of list L according to respective variable costs of shipping of said members of list L prior to determining said subset $L_{opt}$ of list L.

16. The non-transitory computer-accessible storage medium as recited in claim 15, wherein determining said subset $L_{opt}$ comprises:
for an integer i ranging from 1 to the number of members of list L, identifying a particular subset (P) of list L, wherein the particular subset P consists of the first i members of list L, and wherein the particular subset of P optimizes, under the conditions represented by said given combination of values, the following calculation: ((the sum of: fixed costs of shipping a shipment group according to said entry of said iterator, and variable costs of shipping a shipment group including the members of the subset $L_{opt}$), divided by the number of items in said subset P); and
assigning members of particular subset P as members of subset $L_{opt}$ of list L.

17. The non-transitory computer-accessible storage medium as recited in claim 13, wherein the operations further comprise:
evaluating one or more piecewise linear cost functions to determine said cost of shipping a shipment group.

18. The non-transitory computer-accessible storage medium as recited in claim 13, wherein determining said subset S comprises determining a particular candidate subset of said working set W that minimizes: (said fulfillment cost function for said particular candidate subset, divided by a number of items of said particular candidate subset).

19. The non-transitory computer-accessible storage medium as recited in claim 13, wherein said plurality of nodes comprises one or more fulfillment centers.

20. The non-transitory computer-accessible storage medium as recited in claim 13, wherein said plurality of nodes comprises one or more drop shippers.

21. The non-transitory computer-accessible storage medium as recited in claim 13, wherein said one or more decision variables include a set indicative of a plurality of shipping methods provided by one or more shipping carriers.

22. The non-transitory computer-accessible storage medium as recited in claim 13, wherein said one or more decision variables include a set indicative of a plurality of outbound paths within one or more of said nodes of said fulfillment network.

23. The non-transitory computer-accessible storage medium as recited in claim 13, wherein the operations further comprise:
prior to iterating over said multiple combinations of values for said one or more decision variables, excluding one or more possible combinations of values of said one or more decision variables from said multiple combinations of values.

24. The non-transitory computer-accessible storage medium as recited in claim 13, wherein the operations further comprise:
prior to outputting that said one or more shipment groups be shipped to said given customer, performing a local solution space search that refines membership of said one or more shipment groups.

25. A system, comprising:
one or more computer systems configured to implement an order input system and a fulfillment planning system, wherein:
the order input system is configured to receive an order specifying a plurality of items for delivery to a given customer; and
the fulfillment planning system is configured to:
iteratively partition said plurality of items to assign each of said plurality of items into one of one or more shipment groups, wherein prior to said partitioning, a working set (W) of items in said order remaining to be assigned to a shipment group includes each of said plurality of items; and
output an instruction that said one or more shipment groups be shipped to said given customer;
wherein each of said one or more shipment groups is respectively designated to be shipped from a respective one of a plurality of nodes within a fulfillment network, wherein to implement each iteration of said partitioning, the fulfillment planning system is further configured to:
for the working set W of items in said order remaining to be assigned to a shipment group, determine a subset (S) of said working set W that optimizes: a fulfillment cost function for said subset S, divided by a number of items of said subset S;
assign said subset S to a respective shipment group; and
remove said subset S from said working set W;
wherein to determine said subset S, the fulfillment planning system is further configured to iterate over multiple combinations of values for one or more decision variables, wherein each combination of said multiple combinations includes one or more values indicative of a particular node of said plurality of nodes, and wherein to perform each iteration for a given combination of values of said multiple combinations of values, the fulfillment planning system is further configured to:
generate a list (L) of items of working set W that can permissibly be shipped according to conditions represented by said given combination of values;
determine a subset ($L_{opt}$) of list L that optimizes, under the conditions represented by said given combination of values: a cost of shipping a shipment group of the subset $L_{opt}$, divided by the number of items in the subset $L_{opt}$;
if the cost of shipping said shipment group of said subset $L_{opt}$ is more optimal than a current best cost $C_{best}$, assign said items of said subset $L_{opt}$ as the items of said subset S and assign said cost of shipping said shipment group as said current best cost $C_{best}$; and
if the cost of shipping said shipment group of said subset $L_{opt}$ is not more optimal than the current best cost $C_{best}$, leave said subset S and said current best cost $C_{best}$ unchanged;
wherein prior to iterating over said multiple combinations of values, said subset S is empty and said current best cost $C_{best}$ is a default value.

26. The system as recited in claim 25, wherein said cost of shipping a shipment group of the subset $L_{opt}$ equals the sum of: fixed costs of shipping said shipment group according to said given combination of values, and variable costs of shipping said shipment group including the members of the subset $L_{opt}$ according to said given combination of values.

27. The system as recited in claim 26, wherein the fulfillment planning system is further configured to sort members of list L according to respective variable costs of shipping of said members of list L prior to determining said subset $L_{opt}$ of list L.

28. The system as recited in claim 27, wherein to determine said subset $L_{opt}$, the fulfillment planning system is further configured to:

for an integer i ranging from 1 to the number of members of list L, identify a particular subset (P) of list L, wherein the particular subset P consists of the first i members of list L, and wherein the particular subset of P optimizes, under the conditions represented by said given combination of values, the following calculation: ((the sum of: fixed costs of shipping a shipment group according to said entry of said iterator, and variable costs of shipping a shipment group including the members of the subset $L_{opt}$), divided by the number of items in said subset P); and assign members of particular subset P as members of subset $L_{opt}$ of list L.

29. The system as recited in claim 25, wherein the fulfillment planning system is further configured to evaluate one or more piecewise linear cost functions to determine said cost of shipping a shipment group.

30. The system as recited in claim 25, wherein to determine said subset S, the fulfillment planning system is further configured to determine a particular candidate subset of said working set W that minimizes: (said fulfillment cost function for said particular candidate subset, divided by a number of items of said particular candidate subset).

31. The system as recited in claim 25, wherein said plurality of nodes comprises one or more fulfillment centers.

32. The system as recited in claim 25, wherein said plurality of nodes comprises one or more drop shippers.

33. The system as recited in claim 25, wherein said one or more decision variables include a set indicative of a plurality of shipping methods provided by one or more shipping carriers.

34. The system as recited in claim 25, wherein said one or more decision variables include a set indicative of a plurality of outbound paths within one or more of said nodes of said fulfillment network.

35. The system as recited in claim 25, wherein the fulfillment planning system is further configured to:

prior to iterating over said multiple combinations of values for said one or more decision variables, excluding one or more possible combinations of values of said one or more decision variables from said multiple combinations of values.

36. The system as recited in claim 25, wherein the fulfillment planning system is further configured to:

prior to outputting said instruction that said one or more shipment groups be shipped to said given customer, perform a local solution space search that refines membership of said one or more shipment groups.

* * * * *